Sept. 15, 1959      E. F. GUTH, SR      2,904,673
LIGHT DIFFUSORS FOR ILLUMINATING DEVICES
Filed Feb. 13, 1957      2 Sheets-Sheet 1

INVENTOR:
EDWIN F. GUTH SR.
By Grummer and Sutherland
ATTORNEYS.

Sept. 15, 1959      E. F. GUTH, SR      2,904,673
LIGHT DIFFUSORS FOR ILLUMINATING DEVICES
Filed Feb. 13, 1957      2 Sheets-Sheet 2
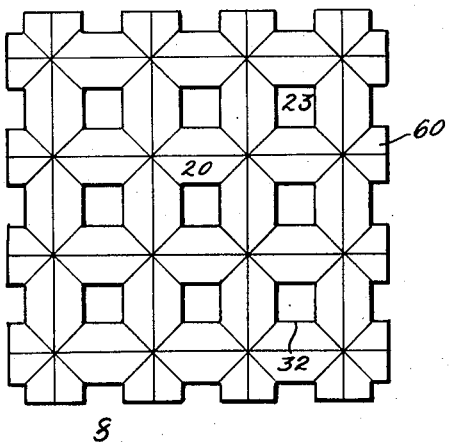
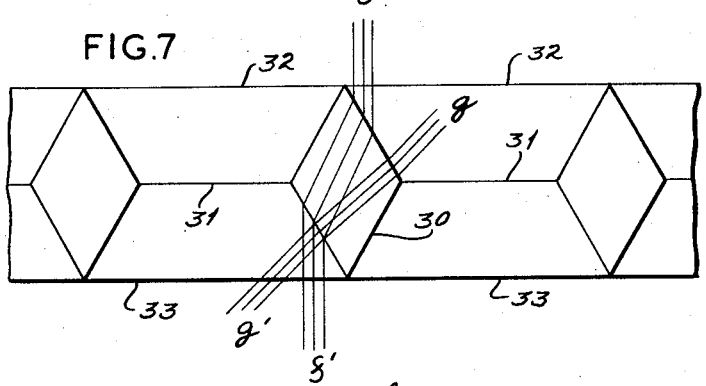
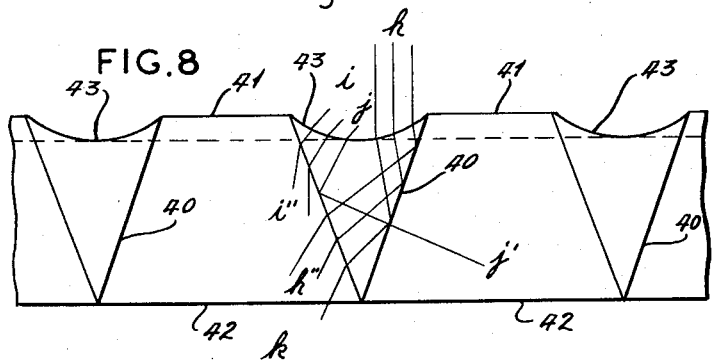
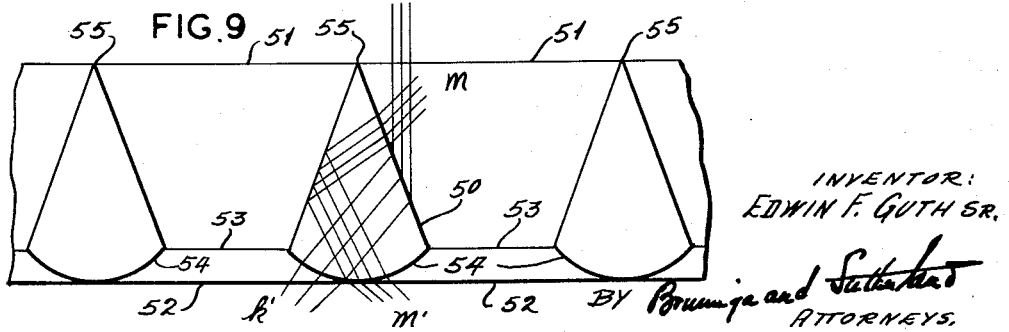
INVENTOR:
EDWIN F. GUTH SR.

С

United States Patent Office 2,904,673
Patented Sept. 15, 1959

2,904,673

LIGHT DIFFUSORS FOR ILLUMINATING DEVICES

Edwin F. Guth, Sr., Florissant, Mo.

Application February 13, 1957, Serial No. 639,985

4 Claims. (Cl. 240—78)

This invention relates generally to the control of light, and particularly to louvers or lattices for use in connection with lighting fixtures and in other situations where it is desired to control the dispersion and direction of light between the source thereof and the region upon which the illumination is desired.

In Patent No. 2,745,001, granted May 8, 1956, the lattice defines between the walls thereof a multiplicity of generally rectangular apertures adapted to diffuse the light passing therethrough from a suitable light source. Such lattice in the embodiments described is of molded translucent material.

One of the objects of this invention is to provide a light controller, in the form of a lattice, so constructed as to disperse and direct the light incident thereon in a manner such as to produce comfortable seeing conditions at high efficiency.

Further objects will appear from the detail description in which will be described a number of embodiments of this invention; it is to be understood, however, that this invention is susceptible of various embodiments within the scope of the appended claims.

Generally stated, and in accordance with illustrative embodiments of this invention, the light controller comprises a lattice of light-transmitting (preferably transparent) material defining between the walls thereof a multiplicity of apertures, the walls between apertures being of a character and shaped to constitute lenses which deflect the light incident upon the lattice to direct and disperse it as it bars the exit face of the lattice. In accordance with embodiments to be described, the walls are formed to deflect (both refract and reflect) the light incident on the lattice variably from the entrances to the exits of the lattice; in some embodiments the deflection is increasingly from the light entrances to the light exits, and in other embodiments increasingly from the exits to the entrances. While the deflection may be in only one direction, or in two opposite directions, with reference to the area of the lattice, the deflection may also be in transverse directions with respect to the area of the lattice. This is accomplished by shaping the lattice walls so that the open spaces defined between them have the shape of a lens to accomplish the desired deflection. A practical shape is that of a truncated geometric solid of the character represented by a pyramid, a hemisphere or a cone whose directrix may be either polygonal or curvilinear, and whose generatrix may be either a series of straight lines, or a curved line. The open spaces may, however, be of compound shape, e.g., superposed frusto-pyramids.

In the accompanying drawings:

Figure 6 is a plan view of the light controller shown in Figure 5 and which but for variation in proportions between open and solid regions is likewise a plan view of the other embodiments from the wall-vertex face;

Figure 7 is a detail cross-wise, like Figures 3 and 5, but illustrating the optical principles of another embodiment of the light controller;

Figure 8 is a detail cross-wise of a light controller similarly illustrating the optical principle of another embodiment of the invention; and Figure 9 is a detail cross-wise of a light controller similarly illustrating the optical principle of still another embodiment.

Figure 1:
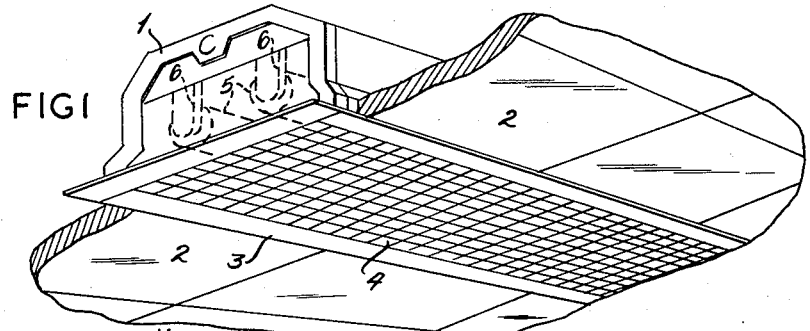
Figure 1 is a perspective view of an illuminating device provided with a light controller constructed in accordance with this invention.

Referring to the accompanying drawings, and more particularly to Figure 1, 1 designates the fixture which may be supported in any suitable manner as in the ceiling 2 of a room. A frame 3 supports the light controlling lattice indicated generally at 4 in any suitable manner, as in Patent No. 2,745,001. The fixture is provided with one or more lamps 5, which are illustrated as the fluorescent type but may be incandescent or other type, supported in receptacles 6. These lamps are, therefore, in a position to direct light on the top on entrance face of the controlling lattice and therethrough. The fixture itself may be provided with reflectors (not shown) on the inside thereof to further direct the light on the lattice.

Figure 2:
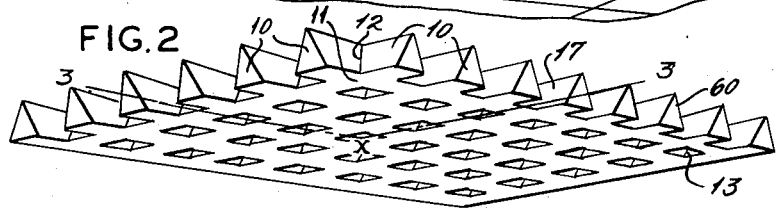
Figure 2 is a perspective view of one embodiment of the light controller.
Figure 3:
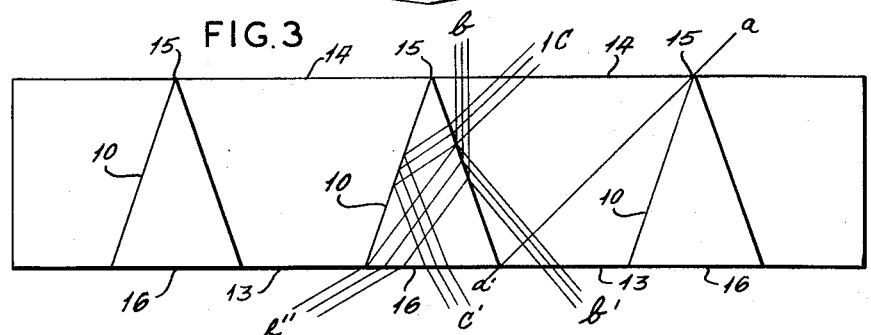
Figure 3 is a detail cross-wise (at a section taken along either of lines 3—X in Figure 2) showing the optical principles of the controller shown in Figure 2.

Referring to Figures 2 and 3, the light controller 4 consists of a series of translucent, preferably transparent, prisms 10 which intersect and are connected as shown at 11 and 12 to define therebetween a series of frusto-pyramidal open spaces, each terminating in a small planar aperture 13 and a large planar aperture 14 which, as shown, are of generally rectangular formation, more specifically, of square shape. The prism ends 17 of the lattice may be formed to each provide one-half of an aperture and two or more lattices may be placed end to end or side to side in a holder such as 3, Figure 1.

As a practical embodiment, the lattice may be ⅜ inch thick (i.e., the distance between the planes of apertures 13 and 14), the apertures 13 a quarter-inch on a side, and the apertures 14 a half-inch on a side. Accordingly, the apices 15 of the prisms 10 are spaced a half-inch apart, and the bases 16 of the prisms are a quarter-inch between adjacent aligned apertures 13. These dimensions may, however, be varied to suit various conditions.

Figure 3 shows the principle of operation of the diffusor. A light beam $a$, $a'$ from a source above the plane of apertures 14 just misses an apex 15 and just misses the base edge of the next adjacent prism, thus passing through both apertures and the intervening open space without reflection or refraction. Likewise, other beams passing through the lattice and not striking any prism 10 will likewise pass through the apertures without reflection or refraction. Beam $b$ is reflected, in part, so as to issue through an aperture 13 at $b'$; however, part of beam $b$ passing through the prism will be refracted and issue as shown at $b''$. Beam $c$ will be refracted and reflected and will issue at $c'$. Accordingly, except for light passing directly through both apertures as, for instance, beam $a$, $a'$, the light will be dispersed as shown by the beams $b'$, $b''$, and $c'$.

Figure 4:
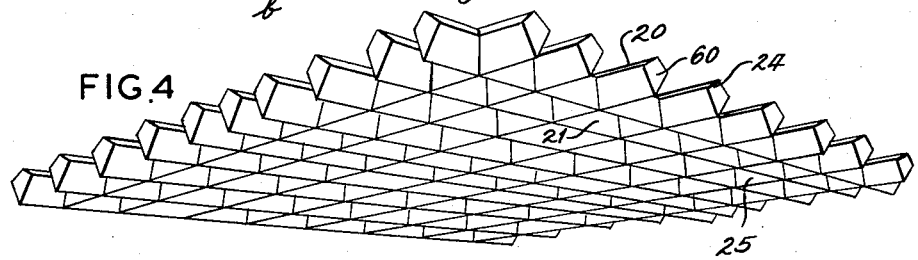
Figure 4 is a perspective view of another embodiment of the light controller.
Figure 5:
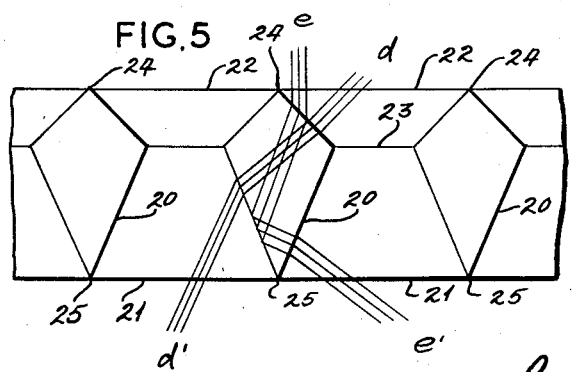
Figure 5 is a detail cross-wise of Figure 4 showing the optical principles of the controller of Figure 4.

Figures 4, 5 and 6 show prisms 20 integrally connected as shown to provide a series of open spaces each having exterior apertures 21 and 22, and an intervening aperture 23 of less area. The apertures may likewise be rectangular or square. As a practical embodiment, the lattice may be ⅜ inch thick with a distance of ⅜ inch between the apices 24 and with a like distance between the apices 25, while the contracted apertures 23 will be 5/32 inch.

Figure 5 shows the optical principle of this lattice. Beam *d* is refracted and issues as shown at *d'*. Beam *e* is refracted and reflected and issues as shown at *e'*. The operation of this lattice is generally along the lines of that of Figures 3 and 4, but in this case the walls of the lattice increase from the entrance and the exit to a zone 23 therebetween. The bottom of the prism 20 may also be truncated. The angles to the horizontal are indicated on Figure 5.

Figure 7 shows another embodiment of this invention in which prisms 30 are connected as shown to form contracted intermediate apertures 31 with larger apertures 32 and 33 at the exterior planes of the panel. As a practical embodiment, the thickness of the lattice may be ⅜ inch with apertures 31 a quarter-inch square, and with apertures 32 and 33 a half-inch square.

Figure 7 shows the principle of operation of this lattice. Beam *f* is refracted and issues at *f'*, while beam *g* is refracted and issues at *g'*. Again, the operation is generally similar to that of Figure 5.

In Figure 8, a lattice of prisms 40 are integrally connected generally as in Figure 2, to form square apertures 41 at one exterior plane and larger apertures 42 at the other exterior plane of the louver. As a practical embodiment, the lattice may be ⅜ inch thick with the apertures 41 a quarter-inch square, the apertures 42 a half-inch square, and the base dimension of the prism a quarter-inch. The base face 43 of a prism is shown as concave.

Figure 8 shows the principle of operation, a series of beams *h* striking the face 43 are refracted and issue at *h'*. Beam *i* striking the face 43 is refracted and issues at *i'*. However, a beam *j* entering the prism is reflected and then refracted as shown at *j'*.

In Figure 9 a lattice of prisms 50 are integrally connected generally as in Figure 2 to form apertures which may be of square section with the exterior ones 51 and 52 of larger area than that of an intermediate aperture 53. The base face of the prism is in this case convex as shown at 54, so that the open space defined above the plane of aperture 53 is the frustum of a regular square based pyramid or substantially so, while that defined below the plane of aperture 53 is the frustum on a regular square based quasi-pyramid whose faces (defined by convex faces 54) are concave. As a practical embodiment, with the lattice 7/16 inch thick (from an apex 55 to the apogee of convex face 54), the apertures 51 and 52 are a half-inch square, the apertures 53 are a quarter-inch square, and the cross-dimension of base face 54, in the plane of apertures 53, is a quarter-inch.

Figure 9 shows the principle of operation of the lattice. A series of beams *k* impinging on the prism are refracted and issue at *k'*, while a series of beams *m* impinging on the prism are refracted and reflected and issue at *m'*.

For each of the embodiments, the drawings show the lattice walls shaped so as to define square apertured frusto-pyramidal (compound, in the case of Figures 5, 7, and 9) open spaces, but it should be understood that the spaces may be shaped so that the apertures are of other quadrilateral or curvilinear shapes.

Depending upon the character of illumination desired, the several louver embodiments described may be used with the upper side (as shown in the drawings) addressed toward the source of light, or reversed so that the lower side (as shown in the drawings) is addressed toward the light source and hence becomes (in a ceiling fixture) the upper side. For example, a louver as shown in Figures 2 and 3, which was molded integrally of clear polystyrene, and whose prisms had an apex angle of 37°, was comparatively tested in a fixture provided with three twenty-watt fluorescent lamps, and in successive tests the fixture was equipped with the louver of Figures 2 and 3 in the "Apex Up" position, in the "Apex Down" position, with a standard imperforate glass diffuser (known commercially as "Corning #70") and with no shielding at all. From these tests, the following candle power values were obtained at a distance of forty feet at various angles from nadir:

| Angle From Nadir | Actual Candlepower | | | | | | | |
|---|---|---|---|---|---|---|---|---|
| | Embodiment of Figs. 2 and 3 | | | | Standard Glass Diffuser | | Unshielded | |
| | Apex Up | | Apex Down | | | | | |
| | I | II | I | II | I | II | I | II |
| 90 | 0 | 0 | 0 | 0 | 0 | 0 | 0 | 0 |
| 85 | 17 | 19 | 39 | 32 | 16 | 16 | 0 | 0 |
| 75 | 85 | 79 | 139 | 123 | 50 | 39 | 75 | 50 |
| 65 | 153 | 154 | 244 | 220 | 105 | 63 | 157 | 162 |
| 55 | 208 | 201 | 330 | 307 | 211 | 154 | 346 | 299 |
| 45 | 322 | 292 | 350 | 322 | 362 | 346 | 476 | 428 |
| 35 | 481 | 456 | 419 | 393 | 536 | 511 | 550 | 542 |
| 25 | 570 | 590 | 452 | 464 | 629 | 626 | 572 | 629 |

In the foregoing table, the values indicated in the columns headed "I" were obtained when the fixture supporting the fluorescent lamps (which also supported the louver) was rotated about an axis parallel with the axes of the fluorescent lamps; while the values indicated in the columns headed "II" were obtained when the supporting fixture was rotated about an axis perpendicular to the axes of the fluorescent lamps. By the heading "Apex Up" is meant that the louver panel was mounted in the supporting fixture so that the apices 15 were addressed toward the fluorescent lamps; and by "Apex Down" is meant that the louver panel was reversed in the fixture so that the apices 15 were addressed away from, while the bases 16 were addressed toward, the fluorescent lamps. Taking the candlepower values indicated under the column headed "Unshielded" in the foregoing table as representative of 100% efficiency of light transmission, the efficiency of the louver of this invention, when used in its "Apex Up" position, is 86.1%; when used in its "Apex Down" position, is 88.7%; while the efficiency of the standard glass diffuser is 82.97%.

The brightness at viewing angles of between 45 and 90° from nadir with the louver shown in Figures 2 and 3 in its "Apex Up" and "Apex Down" positions is indicated by the following table:

| Angle From Nadir | Average Brightness | | | |
|---|---|---|---|---|
| | Apex Up | | Apex Down | |
| | I | II | I | II |
| 90 | 0 | 0 | 0 | 0 |
| 85 | 0.7 | 0.8 | 1.5 | 1.3 |
| 75 | 1.1 | 1.0 | 1.9 | 1.6 |
| 65 | 1.2 | 1.3 | 2.0 | 1.8 |
| 55 | 1.2 | 1.3 | 2.0 | 1.9 |
| 45 | 1.6 | 1.4 | 1.7 | 1.6 |

From the value stated in the foregoing tables, those skilled in the art will readily understand that when the louver of this invention is used in its "Apex Up" position it produces narrow beam spread downward illumination with low brightness in the normal viewing angles. On the other hand, when the louver is used in its "Apex Down" position it produces a broad distribution of light as is highly desirable for the illumination of hallways, store rooms and similar situations where high brightness is desirable or where glare is of little or no concern.

For optimum results, where the open spaces between the prisms are of regular frusto-pyramidal shape and the bases of the prisms are flat at one surface of the louver, it is desirable that the larger apertures of the louvers be not more than three-quarters or less than three-eighths of an inch on a side, and that the apex angle of the prisms be between 34° and 45°. Otherwise, special contouring of the bases of the prisms, as illustrated by Figures 5, 7, 8 and 9 is required to achieve equivalent results. Such contouring adds to the cost of the molds necessary to produce the louver as an integrally molded panel.

The light controller may be made of any suitable light-transmitting material, such as glass or a plastic molding material like methyl-methacrylate, or polystyrene, which have good light-transmitting properties. As indicated herein, before it is preferred that the material be clear and transparent but where diffusion is desired more or less, cloudiness may be introduced into the material, with some compromise in directional control. Synthetic resins lend themselves readily to molding under pressure in a sectional mold in which the mold surfaces can be highly polished. Likewise, although glass is more difficult to press in large areas than synthetic resins, the lattice can be made of an area which lends itself to pressing and the glass may then be annealed in any suitable manner. The pressing may be done in sectional molds of a character used in the making of imitation cut glass trays and bowls. Sections of the lattice may be placed end to end and side to side to form an area of any desired extent. In such a case, the projecting ends 60 of the prisms of two lattices will together form complete apertures at the adjoining edges of the sections.

From the foregoing description, those skilled in the art will understand that the invention accomplishes its objects and provides a highly efficient diffusor which has all the advantages of an imperforate lens, as well as the advantages of a louver. While several embodiments have been described in detail, it will be understood that the invention is not limited to the details of the embodiments as described.

Having thus described the invention, what is claimed and desired to be secured by Letters Patent is:

1. A light-controlling panel comprising a lattice of elongate intersecting prisms of substantially transparent material, said prisms being spaced to define a multiplicity of generally frusto-pyramidal openings extending entirely through the panel, said prisms being substantially triangular in cross-section and having their apices substantially in the plane of the larger base of said frusto-pyramidal openings, the angle included between the convergent surfaces of said prisms which define said apices being between 34 and 45°.

2. A light-controller as set forth in claim 1, wherein the altitude of the frusto-pyramidal openings corresponds approximately to the apex-to-apex spacing between adjacent parallel elongate prisms.

3. A light-controlling panel as set forth in claim 1, wherein the bases of the openings are substantially square with the side dimensions of the smaller bases corresponding approximately to the base dimension of the prisms.

4. A light-controlling panel comprising a lattice formed of interconnected prisms spaced to define a multiplicity of openings extending entirely through the panel, said openings being of uniform shape and size, said prisms being formed of clear material having light-refracting and light-reflecting properties, said prisms being of triangular cross-section with their vertices at one side of said panel and their bases at the other side thereof, and the vertex angle of said prisms being approximately 37°.

References Cited in the file of this patent

UNITED STATES PATENTS

| | | |
|---|---|---|
| 1,241,886 | Rowe | Oct. 2, 1917 |
| 2,143,148 | Guth | Jan. 10, 1939 |
| 2,398,507 | Rolph | Apr. 16, 1946 |
| 2,506,951 | Doane | May 9, 1950 |
| 2,745,001 | Guth | May 8, 1956 |
| 2,756,325 | Zwick | July 24, 1956 |